Patented Jan. 19, 1926.

1,570,219

UNITED STATES PATENT OFFICE.

HERMAN C. HELMLE, OF SPRINGFIELD, ILLINOIS, ASSIGNOR OF ONE-HALF TO WESLEY C. PRUITT, OF SPRINGFIELD, ILLINOIS.

COLOR-BLENDING PAVEMENT-CRACK FILLER.

No Drawing.    Application filed August 2, 1923.    Serial No. 655,329.

*To all whom it may concern:*

Be it known that I, HERMAN C. HELMLE, a citizen of the United States, residing at Springfield, in the county of Sangamon and State of Illinois, have invented a certain new Color-Blending Pavement-Crack Filler, of which the following is a specification.

This invention relates to road building in that it is adapted to be used for filling cracks that may develop in pavements, particularly Portland cement concrete pavement.

The purposes of this invention are first, to provide an economical and durable material for filling pavement cracks that when in normal use after application is adapted to successfully withstand the varying temperatures that are obtained in changing climatic conditions.

A further object of my invention is to provide a composition that will be easily handled.

A further object of my invention is to provide a pavement crack filler that when applied may be poured into cracks easily and subsequently settle to the most remote recesses of the large or small crack surfaces when still in liquid form.

A further object of my invention is to provide a pavement crack filler of the above mentioned merits that when ultimately set will not become brittle at reasonably low temperatures and will not liquefy at hot climatic temperatures.

A further object of my invention is to provide a pavement crack filler of the class above mentioned that will shade or tint in color with that of the pavement.

A further object of my invention is to provide a pavement crack filler whose coloring pigments are inert to the main body ingredients of the composition.

The desired objects of my invention are attained by the color blending pavement crack filler described in the annexed specification and recited in the claims.

My composition consists of a mixture of rubber, rosin, 37 to 40 degrees Bé. distillate oil, titanium dioxide and barium sulphate.

In preparing the composition I prefer to use the ingredients in about the following proportions; one-half to —3— lbs. of crude rubber, —25— to —35— lbs. of rosin, —1— to —4— lbs. of —37— to 40° Bé. distillate oil, 0.05 to 0.5 lb. of titanium dioxide, 0.1 to 1.0 lb. of barium sulphate and enough lamp black to tint to the desired shade of gray.

My preferred method of applying this mixture is to heat the same to approximately 120 to 130 deg. C., at which temperature it becomes a flowing liquid and may then be applied with any suitable pouring can, such as, asphalt pouring can. After it is poured into the cracks it begins to set up enough within five to ten minutes to permit traffic over the same without adhering to vehicle wheels.

Having thus described the nature of my invention, what I claim as new and desire to secure by Letters Patent is:

1. A color blending water proof composition for filling pavement cracks, comprising approximately one-half to —3— lbs. of crude rubber, —25— to —30— lbs. of rosin, —1— to —4— lbs. of 37 to 40° Bé. distillate oil, 0.05 to 0.5 lbs. titanium dioxide, 0.1 to 1.0 lbs. of barium sulphate and enough lamp black to tint to the desired shade of gray.

2. A color blending water proof composition for filling pavement cracks, comprising one lb. of crude rubber, 32 lbs. of rosin, —2— lbs. of 37 to 40° Bé. distillate oil, 0.1 —1— lb. of titanium dioxide, 0.37 lbs. of barium sulphate and enough lamp black to tint to the desired shade of gray.

In witness whereof I hereunto set my hand and seal this 31st day of July A. D. 1923.

HERMAN C. HELMLE. [L. S.]